United States Patent
Hand et al.

[11] Patent Number: 6,058,661
[45] Date of Patent: May 9, 2000

[54] METHOD AND APPARATUS FOR PREVENTING CRAWLING INSECTS AND OTHER CRAWLING PESTS GAINING ACCESS TO SOURCES OF WATER

[76] Inventors: Herbert H. Hand, 233 Tram Rd., Columbia, S.C. 29201; Herbert G. Hand, 5426 Richenbacher Ave., Apt. #301, Alexandria, Va. 22304

[21] Appl. No.: 08/321,300

[22] Filed: Oct. 11, 1994

Related U.S. Application Data

[63] Continuation-in-part of application No. 07/570,339, Aug. 21, 1990, Pat. No. 5,353,556, which is a continuation-in-part of application No. 07/271,040, Nov. 15, 1988, Pat. No. 4,905,629, which is a continuation-in-part of application No. 07/133,171, Dec. 11, 1987, Pat. No. 4,784,086, which is a continuation-in-part of application No. 06/914,335, Oct. 2, 1986, abandoned.

[51] Int. Cl.$^7$ .................................................... A01M 1/10
[52] U.S. Cl. ........................... 52/101; 43/107; 43/121; 239/288
[58] Field of Search .................................. 52/101; 47/23, 47/24; 43/107, 108, 109, 121; 119/61; 239/288, 288.3, 288.5; D23/214, 221, 227; D30/117

[56] References Cited

U.S. PATENT DOCUMENTS

| | | |
|---|---|---|
| 042 | 4/1841 | Newhall . |
| 44,238 | 9/1864 | Towne . |
| 46,298 | 2/1865 | Hilton . |
| 49,453 | 8/1865 | Starbuck . |
| 57,937 | 9/1866 | Mathews . |
| 110,996 | 1/1871 | Parks ........................................ 47/23 X |
| 220,481 | 10/1879 | Loring ....................................... 43/108 |
| D. 303,169 | 8/1989 | Hovey ..................................... D30/130 |
| 479,980 | 8/1892 | Gordon . |
| 481,311 | 8/1892 | Smith . |
| 713,803 | 11/1902 | Rothweiler . |
| 730,575 | 6/1903 | Schirra .................................. 43/108 X |
| 784,684 | 3/1905 | Karlsen . |
| 824,272 | 6/1906 | Alexander ................................ 43/109 |
| 983,114 | 1/1911 | Barry ....................................... 43/108 |
| 1,058,566 | 4/1913 | Dunlap ................................. D23/214 X |
| 1,221,999 | 4/1917 | Kreiter . |
| 1,496,720 | 6/1924 | Marsico . |
| 1,569,170 | 1/1926 | Braun et al. . |
| 1,579,534 | 4/1926 | Hibbard et al. . |
| 1,667,048 | 4/1928 | Rawlings . |
| 2,012,651 | 8/1935 | Beall ........................................ 43/124 |
| 2,112,229 | 3/1938 | Davis ........................................ 72/0.5 |
| 2,138,182 | 11/1938 | Lipthrott .................................. 189/34 |
| 2,139,225 | 12/1938 | Easling .................................... 43/107 |
| 2,149,495 | 3/1939 | Barnard et al. .......................... 43/131 |
| 2,150,891 | 3/1939 | Tennison .................................. 72/0.5 |
| 2,165,500 | 7/1939 | Muirhead ................................. 72/0.5 |
| 2,191,811 | 2/1940 | Trampier, Sr. ........................... 119/51 |
| 2,242,266 | 5/1941 | Scales ...................................... 72/0.5 |

(List continued on next page.)

FOREIGN PATENT DOCUMENTS

| | | |
|---|---|---|
| 0 428 379 | 5/1991 | European Pat. Off. . |
| 0 472 385 | 2/1992 | European Pat. Off. . |
| 2453952 | 11/1980 | France . |
| 2599214 | 12/1987 | France ..................................... 47/24 |
| 158176 | 3/1940 | Germany ................................ 47/24 |
| 4101463 | 7/1992 | Germany ............................... 43/107 |
| 17428 | 4/1904 | Sweden ................................. 43/108 |
| 27246 | 7/1907 | United Kingdom ................. 239/288 |
| 221882 | 9/1924 | United Kingdom ................... 43/107 |
| 472883 | 10/1937 | United Kingdom . |

OTHER PUBLICATIONS

Sear's Catalogue, p. 1348, Printed 1987.

Webster's II New Riverside Dictionary, 1984, Houghton Mifflin Co. p. 809.

Primary Examiner—Laura A. Callo
Attorney, Agent, or Firm—McAndrews, Held & Malloy, Ltd.

[57] ABSTRACT

A crawling pest barrier for placement on a conduit to prevent crawling insects or pests from reaching the outlet of the conduit. A combination of -tactic, ultraviolet light and other barriers are positioned along the conduit with respect to the path of travel of the crawling pest to the outlet of the conduit.

15 Claims, 3 Drawing Sheets

U.S. PATENT DOCUMENTS

| | | | |
|---|---|---|---|
| 2,253,541 | 8/1941 | Torbett | 43/108 |
| 2,258,317 | 10/1941 | Clipper | 43/109 |
| 2,315,989 | 4/1943 | Tennison et al. | 43/107 |
| 2,424,421 | 7/1947 | Temme | 43/121 |
| 2,554,086 | 5/1951 | Block | 119/61 |
| 2,584,301 | 2/1952 | Sinclair | 119/61 |
| 2,677,350 | 5/1954 | Prestidge et al. | 119/61 |
| 2,746,201 | 5/1956 | Warrell | 43/108 |
| 2,796,042 | 6/1957 | Cope | 119/1 |
| 2,813,509 | 11/1957 | Bruno | 119/51 |
| 2,973,148 | 2/1961 | Franz | 239/288 X |
| 3,147,739 | 9/1964 | Shaheen | 119/51.5 |
| 3,195,510 | 7/1965 | Bernstein | 119/61 |
| 3,315,897 | 4/1967 | Stout | 239/288 X |
| 3,361,364 | 1/1968 | Purtell | 239/288.5 |
| 3,441,003 | 4/1969 | Du Mond et al. | 119/61 |
| 3,531,228 | 9/1970 | Reese | 239/288.5 X |
| 3,664,304 | 5/1972 | Carter | 119/61 |
| 3,722,476 | 3/1973 | Van Ness et al. | 119/61 |
| 3,995,595 | 12/1976 | Williams | 119/61 |
| 4,098,018 | 7/1978 | Bartelme | 43/108 |
| 4,128,080 | 12/1978 | Haney | 119/51.5 |
| 4,263,740 | 4/1981 | Hemsarth et al. | 43/114 |
| 4,319,423 | 3/1982 | Judd | 43/121 |
| 4,328,636 | 5/1982 | Johnson | 43/107 |
| 4,357,905 | 11/1982 | Carpenter | 119/61 |
| 4,399,772 | 8/1983 | Salinas | 119/51.5 |
| 4,423,564 | 1/1984 | Davies et al. | 43/121 |
| 4,428,325 | 1/1984 | Koch | 119/61 |
| 4,471,562 | 9/1984 | Brucker | 43/108 |
| 4,691,664 | 9/1987 | Crowell | 119/61 |
| 4,756,116 | 7/1988 | Cutter | 43/108 |
| 4,784,086 | 11/1988 | Hand et al. | 119/61 |
| 4,800,845 | 1/1989 | Budd | 119/61 |
| 4,802,302 | 2/1989 | Alnafissa | 43/114 |
| 4,886,016 | 12/1989 | Atchley | 119/61 |
| 4,896,627 | 1/1990 | Riddell | 119/51.5 |
| 4,905,629 | 3/1990 | Hand et al. | 119/61 |
| 4,966,099 | 10/1990 | Arney | 119/61 |
| 5,042,192 | 8/1991 | Osteen | 43/109 |
| 5,097,641 | 3/1992 | Hand et al. | 52/101 |
| 5,287,648 | 2/1994 | Hand et al. | 43/121 |
| 5,303,523 | 4/1994 | Hand et al. | 52/101 |
| 5,353,556 | 10/1994 | Hand et al. | 52/101 |
| 5,381,959 | 1/1995 | Malkin | 239/288.5 X |

METHOD AND APPARATUS FOR PREVENTING CRAWLING INSECTS AND OTHER CRAWLING PESTS GAINING ACCESS TO SOURCES OF WATER

REFERENCES TO RELATED APPLICATIONS

This is a continuation-in-part of application Ser. No. 07/570,339, filed Aug. 21, 1990, now U.S. Pat. No. 5,353,556, which is a continuation-in-part of application Ser. No. 07/436,412, filed Nov. 14, 1989, now U.S. Pat. No. 5,097,641, which is a continuation-in-part of application Ser. No. 07/271,040, filed Nov. 15, 1988, now U.S. Pat. No. 4,905,629, which is a continuation-in-part of application Ser. No. 07/133,171 Dec. 11, 1987, now U.S. Pat. No. 4,784,086, which is a continuation-in-part of application Ser. No. 06/914,335, filed Oct. 2, 1986, abandoned. All of these prior applications are incorporated herein by reference. Additionally, abandoned application Ser. No. 07/434,411, filed Nov. 13, 1989, is also incorporated herein by reference.

FIELD OF THE INVENTION

This invention relates to fluid delivering systems comprising one or more conduits or supports terminating in one or more above-ground outlets, including apparatus preventing crawling pests from reaching the outlets via the conduits or supports.

BACKGROUND OF THE INVENTION

In recent years, orchards, home owners, and other cultivators of plants have strived to conserve water. Modern orchard sprinkling devices conserve water by using a separate water sprinkler or other outlet spraying upward directly under the canopy of each tree, rather than using fewer outlets, each spraying from above the canopies of several trees. Use of individual sprinklers for each tree has reduced water consumption by ninety percent.

Unfortunately, crawling insects, small snails, and the like are attracted to the water coming from the individual sprinkler heads, particularly as the individual sprinkler heads are located close to the ground and commonly wet the stakes or other apparatus supporting them. The insects and snails gather in great numbers around the emitter of the sprinkler head and ultimately clog the sprinkler, blocking the flow of water so that it ceases to function.

Prior attempts to prevent insects and other pests from gaining access to protected structures have commonly relied on chemicals or traps which can be lost, used up, filled, washed out by sprinkler water, or otherwise easily become ineffective.

OBJECTS OF THE INVENTION

Therefore, it is an object of this invention to provide a physical barrier which prevents snails, slugs, and other pests from climbing from the ground to a fluid outlet supported above the ground.

Another object is to provide such a barrier which does not require the use of chemicals or a fluid-filled moat to repel, poison, frustrate or trap pests.

Yet another object is to provide such a barrier which does not include a mechanical trap or other means to collect pests.

It is a further object of this invention to provide unobtrusive physical barriers that are relatively inexpensive, easy to install, easy to include in the manufacture of an irrigation device support, quick and easy to maintain, and environmentally safe, while having physical and other barriers for preventing crawling insects and other crawling pests from reaching the outlet of a conduit.

It is a further object of the present invention to provide a barrier assembly which may either be incorporated in a conduit when it is manufactured (either as an integral part or as an optional attachment) or as a retrofit on an existing conduit.

Other objects of the present invention will become apparent from the present specification and claims.

SUMMARY OF THE INVENTION

These and other objects of the invention are achieved by a crawling pest preventer which prevents crawling pests from proceeding along a conduit. The preventer includes a generally cylindrical surface adapted to encircle the conduit. A projecting member extends outwardly from the generally cylindrical surface, forming with that surface a first pathway for movement by the crawling pest. An obstacle member is secured to the generally cylindrical surface, spaced apart from the projecting member, blocking the first pathway, and creating multiple -tactic, stereokinetic, elevation topographic, electrical impulse-sensing, heat sensing, olfactory sensing, and ultraviolet light barriers along the first pathway.

DESCRIPTION OF A PREFERRED EMBODIMENT

Figure 1:
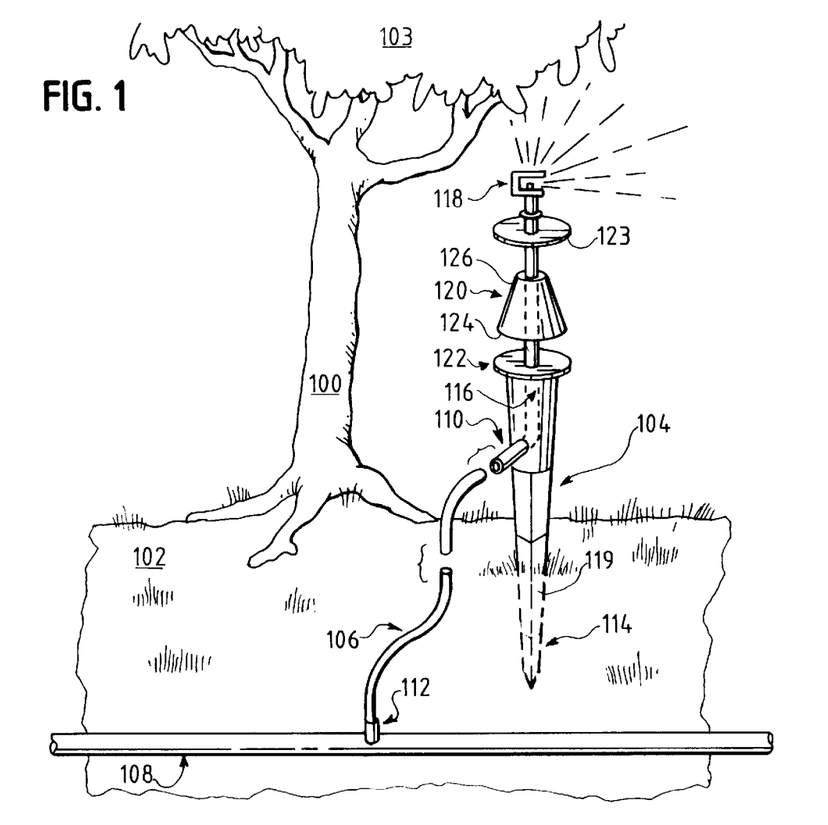
FIG. 1 is a perspective view of an irrigation device including an attached support and a crawling pest preventer according to the present invention.

Referring to FIG. 1, a tree 100 standing in an orchard (not shown in the figures) is planted in the ground 102. The canopy 103 of the tree 100 overhangs an irrigation device 104. Water is supplied to the irrigation device 104 via a water supply branch line 106 from an orchard water supply line 108. An outlet coupling 110 and an inlet coupling 112 provided at the respective ends of the branch line 106 are pressure fitted to maintain water flow. Conventional irrigation hose couplings can be used for this purpose.

The irrigation device 104 has a body including a stake portion 114 defining its lower end, an emitter or sprinkler head 118 defining its upper end, a conduit 116 having a first end defined by the coupling 112 and a second end defined by the sprinkler head 118, and a crawling pest preventer 120 between its ends.

The stake portion 114 is adapted to be driven at least partially into the ground 102 to support the remainder of the irrigation device 104, typically in a substantially vertical orientation. The stake portion 114 can have a hollow cross section, an X-shaped cross section, or any other suitable shape to withstand being pounded into the ground.

The sprinkler head 118 or other structure near the upper end of the irrigation device 104 is adapted to withstand being pounded to drive the irrigation device 104 into the ground. Optionally, the sprinkler head 118 can be threaded to the top of the conduit 116, so the sprinkler head 118 can be installed after the irrigation device 104 is pounded on the top of the conduit 116 to drive it into the ground. Other means for installing the irrigation device 104 in the ground will be readily apparent to an individual skilled in the art.

The body of the irrigation device 104 can be defined at least in part by a hollow shell or housing 119. In the embodiment of FIG. 1, a portion of the conduit 116 between its ends 112 and 118 is sealed within the housing 119, conveying water from the coupling 112 to the sprinkler head 118 and traversing the crawling pest preventer 120.

Figure 2:
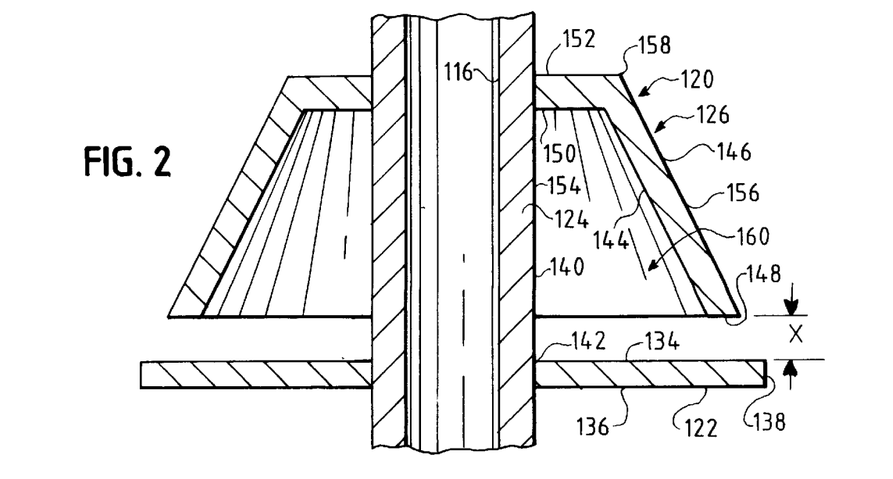
FIG. 2 is a sectional view of the embodiment of FIG. 1, taken along the line 2—2, showing details of the crawling pest preventer.

The crawling pest preventer 120 of the Figures includes an annular disc member 122, optionally an annular disc 123, a cylindrical central member 124 (which, in the embodiment of FIGS. 1 and 2, is a section of the conduit 116), and a frustumconical member 126. In an alternate embodiment, illustrated in FIG. 7, the annular disc members 122 and/or 123 may be omitted. In general, the preventer 120 will be located on the irrigation device 104 between the inlet nipple 112 and the sprinkler head 118.

Figure 7:
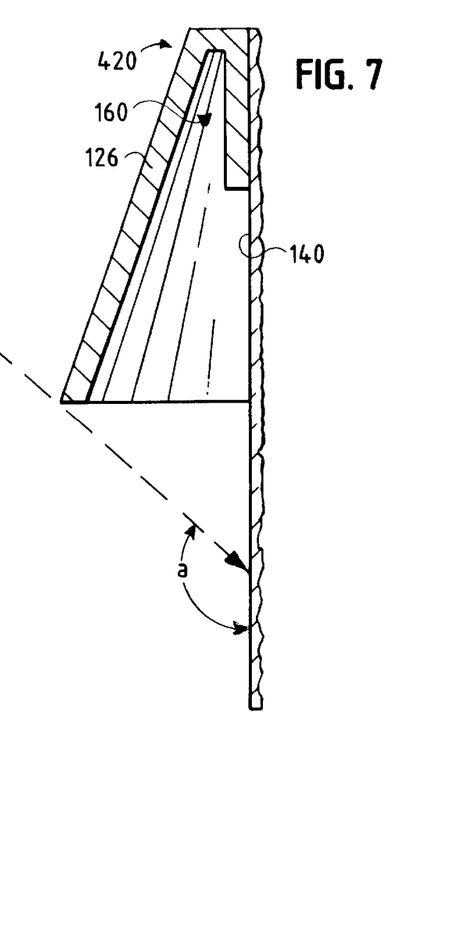
FIG. 7 is a perspective view of another embodiment of a crawling pest preventer.

As shown in FIG. 1, the preventer 120 may be symmetrical in shape, having a rotational axis of symmetry at or near the center of the conduit 116. FIG. 7 shows that this symmetry is not essential—departures from symmetry are within the scope of the present invention.

Figure 3:
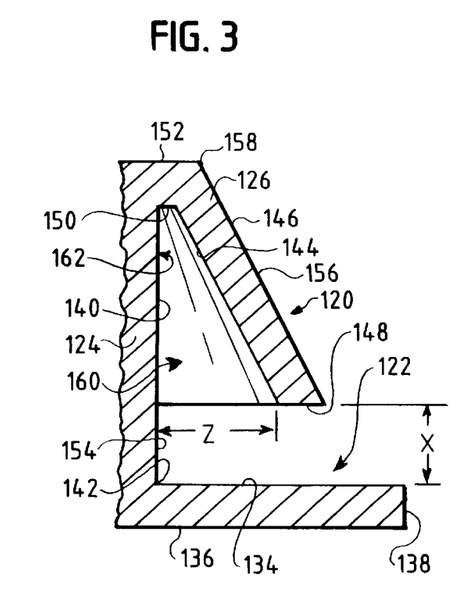
FIG. 3 is a radial half-sectional view, similar to FIG. 2, of another embodiment of a crawling pest preventer.

Referring to FIGS. 1–5, and particularly to FIG. 3, the disc member 122 includes an upper surface 134, a lower surface 136, and an outer edge surface 138. The surfaces 134 and 136 are flat surfaces extending generally orthogonally with respect to the conduit 116 (shown in FIG. 2). The surface 134 is preferably essentially non-reflective or coarse (light-scattering). The outer edge surface 138 connects the upper and lower surfaces 134 and 136.

The annular disc member 123 is provided to prevent water emitted by the sprinkler 118 from spraying or draining directly on the upper surface 134, thereby possibly disrupting the preclusion of pests.

The cylindrical member 124 includes an outer cylindrical surface 140 which meets with the upper surface 134 along a line 142. The frustumconical member 126 includes an inner surface 144 and an outer surface 146, which are connected by an edge surface 148. An annular surface 150 of the frustumconical member provides a path from the outer cylindrical surface 140 to the inner surface 144. The surfaces 140 and 144 preferably have essentially non-reflective or coarse (light-scattering) surfaces.

The frustumconical member 126 can have an outside diameter at its surface 148 which is greater than, equal to, or less than the diameter of the surface 138 of the disc member 122.

A top surface 152 is formed at the top of the preventer 120 and is connected to the outer surface 146 of the frustumconical member 126. In this embodiment, the top surface 152 is a flat annular surface extending orthogonally with respect to the axis of the conduit 116 (shown in FIG. 2).

The outer obstacle wall 126 illustrated in the Figures is a single-thickness member, frustumconical in shape, which is secured along the entire extent of the outer circular edge 158 of the top surface 152. The inner surface 144 of the obstacle wall 126 confronts the outer cylindrical surface 140 of the cylindrical member 124. The obstacle wall 126 is angled outwardly with respect to the cylindrical member 124 for providing a more open area between the lower portions, as compared to the upper portions, of the obstacle wall 126 and the cylindrical wall 124, as shown.

The preventer can be assembled from separate pieces, as shown in FIGS. 1, 2, 6, or 7. For example, the pieces 122 and 126 may be assembled on the member 124. Alternatively, the three members 122, 124, and 126 can be molded or otherwise formed integrally, as shown in FIGS. 3 through 5.

Figure 4:
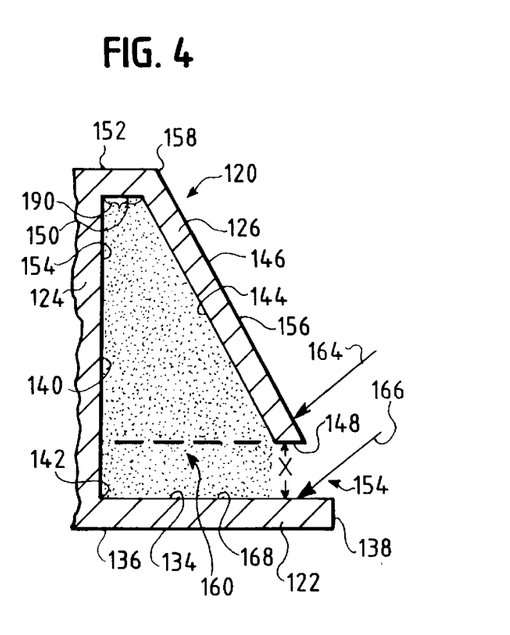
FIG. 4 is a view similar to FIG. 3 of a crawling pest preventer, illustrating interference with visible light rays.
Figure 5:
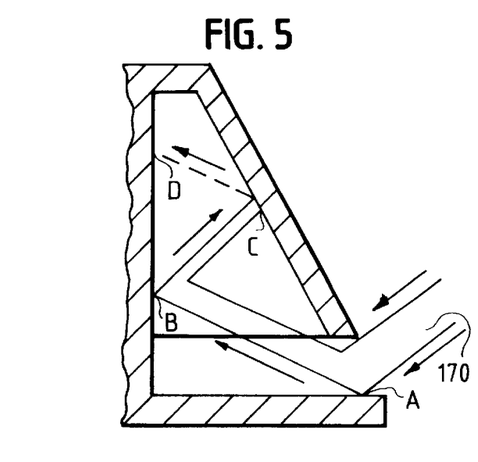
FIG. 5 is a view similar to FIG. 3 of a crawling pest preventer, illustrating interference with ultraviolet and/or lower frequency light rays.

The fully-formed preventers 120 of FIGS. 3–5 may be slid over the conduit 116 (shown in FIG. 2) and secured in place along the conduit 116 by any type of securing device including a frictional fit, glue or other adhesive, welding, etc. For example, a bonding agent may be placed in and substantially fill the interface between the inner cylindrical surface 128 of the preventer 120 and the conduit 116 for providing an impervious and inert bond between the preventer 120 and the conduit 116. The bonding agent may be a flexible elastomeric agent, as for example, RTV Silicone sold by 3M Company. The bond seals off any spaces between the preventer 120 and the conduit 116 which would permit a small crawling pest to bypass the preventer 120 to gain access to the sprinkler 118. The bonding agent is put around the entire surface 128 of the preventer 120 where it meets the conduit 116. The bonding agent is designed to keep moisture from passing as well.

Alternatively, the member 124 may be defined by the wall of the conduit 116 itself, as in FIGS. 1 and 2, in which case the frustumconical member 126 and (preferably) the annular disc member 122 may be slid over the conduit 116 and secured in place along the conduit 116 by any type of securing device including frictional fit, glue or other adhesive, welding, etc, as indicated above.

Alternatively, the entire unit may be molded as one or more parts. If it is molded in more than one part, the various parts can be permanently bonded together, as by solvent or ultrasonic welding.

The three surfaces of the disc member 122, i.e. the upper surface 134, the lower surface 136, and the edge surface 138, together with the outer cylindrical surface 140 and the surfaces of the conduit 116 above and below the preventer 120, provide a first pathway 154 for a crawling pest to take in its attempt to reach the sprinkler 118 from the shell 119 or hose 106. The first pathway 154 must be traversed by the pest if the pest is to crawl from the coupling 112 or shell 119 beneath the preventer 120 to the sprinkler 118.

The first pathway 154 leads to a second pathway 156 formed by the surfaces 150, 144, 148 and 146 of the frustumconical member 126. These two pathways 154, 156 connect in tandem and form a pathway which must be used by the pest to reach the top 152 of the preventer 120. The top surface 152 of the preventer 120 defines the sole entry location of a crawling pest onto the conduit 116 above the preventer 120.

The frustumconical member 126 serves as an obstacle wall which extends outwardly from the cylindrical surface 140. The lower edge 148 of the frustumconical member 126 is spaced above the upper surface 134 of the disc member 122 by a distance "X." "X" must be a sufficient height to prevent the insect or crawling pest from reaching the frustumconical member 126 directly from the upper surface 134 of the disc member 122.

For example, various types of crawling pests account for a large majority of irrigation device infestations. If the largest of the pests are approximately one inch in length, then the height of the outer edge 148 of the obstacle wall 126 should be established at approximately 1¼ inches above the first pathway, i.e., a height such that the pest cannot pull itself up onto the obstacle wall 126. Where larger or smaller pests, or pests able to bridge a greater or lesser distance, are to be expected in the particular environment, or where the axis defining the cylindrical surface 140 deviates from vertical, or where varying amounts and types of foreign material are to be excluded, the height of the outer edge 148 of the frustumconical pathway, i.e., "X," may be adjusted upwardly or downwardly accordingly.

As shown in FIG. 4, the obstacle wall 126 cooperates with the cylindrical member 124 to form a partially enclosed light barrier area 160 which prevents insects or crawling pests from reaching the top surface 152 of the preventer. In order to reach the top surface 152, the pest must pass into the barrier area 160 since the distance "X" is of a sufficient height to prevent the pest from physically reaching up to the obstacle wall 126.

The spacing between the inside surface 144 of the obstacle wall 126 and the cylindrical surface 140 must not be too small. As shown in FIG. 3, the inner surface 144 is spaced from the outer cylindrical surface 140 by at least the distance "Z," which is greater than the distance "X." This requires that the insect or crawling pest be unable to travel between the two surfaces 140, 144 as it makes its upward climb along the outer cylindrical surface 140.

As the pest reaches the point 162 on the cylindrical surface 140, it is approximately the distance "X" from the obstacle wall 126. The pest must travel at least between the disc member 122 and the point 162 before it can reach over to the inner surface 144 of the obstacle wall 126. This distance from the disc member 122 to the point 162 must be sufficient to draw the pest into the barrier area between the walls 124, 126 so that: (1) the pest's -tactic responses will be confused, (2) the pest's elevation topographic sensing capabilities become disoriented, (3) the pest's electrical impulse sensing (seeking) capabilities become less effective, (4) the pest's heat sensing (seeking) abilities will become less effective, (5) the pest's olfactory senses are not as strongly stimulated and will become confused, and (6) the intensity of the ultraviolet light near the point 162 is insufficient for navigation and orientation purposes.

The distance "X" should be sufficient to prevent crawling pests from pulling themselves up onto the outer surface 146. For example, a distance "X" greater than the combined length of both the forelegs and the body length (from the tip of mandibles to the tip of the gaster) of an insect or more than ⅓ of the body length of a gastropod (a snail or slug, for example) or a snake has been found to usually be suitable for excluding those pests. Distances X can be determined for crawling pests by routine experimentation with the expected types and sizes of crawling pests.

For example, with a distance "X" equal to ⅜ inches, the point 162 should be approximately 1½ inches from the upper surface 134 of the disc member 122 if the device is installed with the surface 134 horizontal. However, this distance will vary if the device is installed with the surface 134 at an angle with respect to horizontal.

The outer edge 148 of the obstacle wall 126 is also elevated above the upper surface 134 of the disc member 122 to the height specified as "X" in FIG. 3. This elevation: (1) creates a mechanical barrier or maze which disturbs or disorients the pest's foraging activity; (2) increases the pest's Area Restricted Search (ARS) time, making homing orientation more time consuming for a forager that may have reached the sprinkler 118; (3) disrupts communication among pests during the organization phase of cooperative search and foraging; (4) creates an open space ("X") that (a) exceeds the combined body and foreleg length of an insect, or is greater than ⅓ of the body length of a gastropod or snake, which precludes the pests from "pulling themselves up" onto the wall 126, and (b) prevents the pests from building a structure to circumvent the devices; (5) disrupts the trail pheromones of pests that have reached the sprinkler 118, and may have "jumped" from the obstacle wall 126 to the upper surface 134 of the disc member 122 or to the ground 102; and (6) attenuates the ultraviolet light used by pests for navigation and orientation. Each of these factors is discussed further below.

Crawling pests search for food, shelter or other desired objectives in several modes: Area Restricted Search, olfaction, heat sensing (seeking) capabilities, electrical impulse sensing (seeking) capabilities, trail pheromones, visual cues, and numerous sensorial modalities. Pests initially locate food or other goal alternatives by some combination of an Area Restricted Search, vision, odor, heat sensing, and/or electrical sensing modes in combination with a highly developed internal topographic map developed using multiple sensorial modalities and polarized or unpolarized ultraviolet light from natural or artificial sources. Once the food or other desired objectives are discovered, a trail pheromone is usually deposited by the successful forager as it returns home (nest); and some portion of the colony follows the trail pheromone to the food or other objectives. The mechanical barriers of the preferred embodiments disrupt and/or disorient the pest's foraging activities.

The mechanical barrier disrupts or disorients foraging activity in a multiplicity of ways. Pests (ants) have -tactic responses. A taxis is a reflex or orientation movement by pests (ants) in relation to a source of stimulation. Example taxes are Photo (light), Thigmo (contact, especially with a solid object), GEO (gravity), etc. Taxes may be used individually (one at a time), concurrently (more than one at a time), and serially (one after another); and most taxes may be either positive or negative. Pests (ants) may switch taxes rapidly; and they may switch from positive to negative, or vice versa rapidly. The use of taxes by pests may vary with either or both the environmental states and/or current states of the pest (ant).

As shown in FIG. 4, the obstacle walls 126 and 122 shade the cylindrical surface 140 and a portion of the upper surface 134 from light rays, as represented by the light rays 164, 166. A shadow 168 appears on the upper surface 134 of the disc member 122 beneath the obstacle wall 126. The intensity of light within the barrier area 160 is typically lower than the intensity of light outside the barrier due to the shading of light by the walls 126 and 122.

Figure 6:
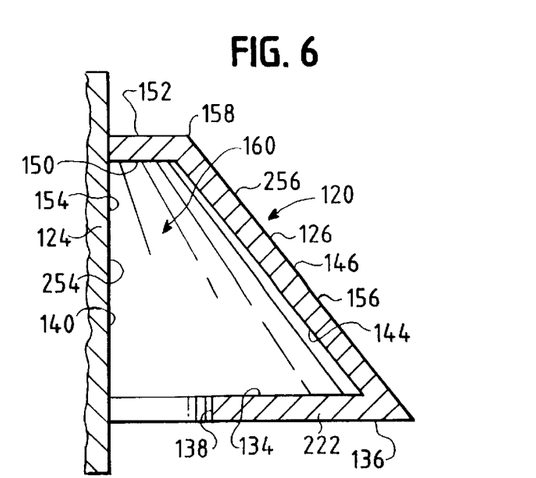
FIG. 6 is a view similar to FIG. 3 of another embodiment of a crawling pest preventer.

If the pest is currently utilizing only its positive phototactic response mode (that is, it prefers to move toward light rather than away from light), the shadow deters the pest from entering the barrier area 160 shown in FIG. 6 between the obstacle wall 126 and the cylindrical wall 124. As the pest begins to climb the cylindrical surface 140 along the first pathway 154 entering the barrier area 160, the pest approaches a progressively darker area within the barrier area 160. The pest's response tendency is to make a positive phototactic choice and exit the barrier area 160 back along the cylindrical surface 140 toward light.

If the pest does not retreat back down the cylindrical surface 140, the pest will climb the cylindrical surface 140 towards the inner surface 150. When the pest reaches the inner surface 150, it places itself in a position where all choices of further movement are positively phototactic. If a pest is in either a negative phototactic response mode or alternating between positive and negative phototactic response modes, the barrier area 160 would disorient or disrupt foraging activity. If the pest is concurrently or serially utilizing other -tactic response modes, the disorientation/disruption would become more severe. For example, if the source it was seeking was initially located through olfactory senses, the pest could utilize, among others, the negative geotactic response mode to establish an elevation topographic reference point. If the pest was concurrently operating in a negative thigmotactic response mode, it would not climb the surface 140 when it was encountered. If it switched to a positive thigmotactic response mode, it would climb the surface 140. As it climbed the surface 140, the olfactory responses would diminish as it entered barrier area 160. Since it was previously operating either concurrently or serially in a negative geotactic response mode, it would receive conflicting stimuli. That is, the olfactory modality indicated the presence of a food supply or other attractant. As the pest climbed the surface 140 to approach the area which the olfactory senses identified, the geotactic response mode would provide positive reinforcement, while the olfactory modality would provide negative reinforcement. The result would be disorientation of the pest. The pest would then switch among -tactic responses to provide clarification. For example, it could switch to positive and/or negative phototactic response modes. If it were positive and switched to a negative phototactic response, it would again become disoriented when it reached the inner surface 150 when all choices of movement would be phototactically positive. If it switched to a positive phototactic response mode at that point, both choices would be equally acceptable. Since it had not discovered the food source or other attractant at the apex of its negative geotactic response, it would most likely return from its original direction back down the surface 140. The barrier area 160 effectively serves to disorient the pest's combined sensorial modalities and -tactic responses. The effect of the barrier 160 on the pest's olfactory responses is similar to the effect of the barrier 160 on a pest's heat seeking and electrical impulse seeking responses.

Insects utilize the polarized ultraviolet portion of the light spectrum to provide navigation and orientation with respect to food, water, and other items of importance. Ultraviolet light sources may be natural or artificial and are used by insects twenty-four hours a day in any type of weather. The barrier area 160 attenuates the intensity of the ultraviolet spectrum by absorption, reflection, and light scattering.

As shown in FIG. 5, a light ray 170, representative of ultraviolet light of a certain wavelength and intensity, radiates as shown by arrows into the barrier area 160. The intensity of the ray 170 is represented by its thickness. At points A, B, C, and D, the intensity of the ultraviolet light ray 170 is attenuated due to (1) absorption, (2) light scattering, and (3) reflection. The point D of FIG. 5 is equivalent to the location of the point 162 of FIG. 3.

An insect loses its ability to obtain navigation and orientation cues from ultraviolet spectrum light when the light level drops below a specified intensity. The barrier 160 effectively attenuates the ultraviolet light so that insects become disoriented. When the disorientation occurs, the insect attempts to remove itself from the barrier 160 in order to regain the ultraviolet navigation and orientation spectrum. The point at which the insect loses its ability to navigate by ultraviolet light is variable depending on: (1) the intensity of the ultraviolet source (e.g. ultraviolet light is more intense from the sun than from the moon), (2) the color, composition, and reflectivity of the pathway 154, (3) the coarseness or smoothness of the pathway 154, and (4) the color, composition, and material of the preventer. Each of these four factors affects the degree of absorption, reflection, and light scattering of ultraviolet light. Therefore, the point 162 (FIG. 3) should be located at a point where the ultraviolet light has attenuated to a level sufficient to confuse the insect's navigation. This objective may be accomplished, for example, by constructing the barrier 160 and the top surface 134 of the plate 122 with non-reflective surfaces to attenuate light reflections.

Stereokinesis is an undirected movement which occurs when an insect encounters an orthogonal surface such as the outer cylindrical surface 140 of the cylindrical member 124. Specifically, the response mode of the insect, when it encounters a vertical surface which is orthogonal to its direction of movement, is that it chooses to follow around the surface rather than climb the route of the vertical surface. The stereokinetic effect in conjunction with the disruption of the -tactic response modes and the disruption and attenuation of the ultraviolet light sources used for navigation produces disorientation in the insect. The stereokinetic effect is intensified by the frustumconical pathway 190 which joins the members 124 and 126.

The preceding illustration may be expanded to the extent of the statistical permutations of the combined sensorial modalities, -tactic responses and stereokinetic movements of the pest and the degree of the ultraviolet and non-polarized light attenuation used by the pest to navigate and orient itself.

A search mode utilized by insects is an Area Restricted Search (ARS). Several methods of foraging activity are used in an ARS. However, the present invention has the same effect on all methods of foraging activity included in an ARS. The present invention increases the distance the insect must travel, and thus the search time required, during an ARS because the insect must cross the surfaces 136, 138, 134, 140, 150, 144, 148, 146 and 152, as opposed to a single exterior surface, to successfully use ARS. The distance traveled in foraging activity is thus longer than it would be without the device. The increased ARS time makes homing orientation for the insect more time-consuming, which puts it at a comparative time disadvantage with competing foragers.

In addition to the ARS time, other disadvantages are created by the invention. For example, a forager that discovers an objective source (here, a source of water) protected by the present invention may mark his discovery by depositing a trail pheromone as it leaves an objective it has found. The trail pheromone is volatile, and thus has a scent which decreases in intensity as a function of time. Trail pheromones are specific scents which may be used as a communication method to indicate the presence of a food source or other objective to the colony, specifically to harvesters, which subsequently follow the trail pheromone to find the objective. The recruiting of harvesters by the foragers is known as the "organization phase" of cooperative foraging.

The present invention increases the time required for the forager to deposit a trail pheromone, and for recruited harvesters to home in on the objective marked by the forager. These delays result because a forager leaving the objective and harvesters following the successful forager must traverse the surfaces 136, 138, 134, 140, 150, 144, 148, 146 and 152. The decrease in intensity of the deposited trail pheromones as a result of this time delay will produce one or more of the following false signals: a weak scent, falsely signifying an unimportant objective to harvesters; no scent, falsely indicating that no objective has been found; or a scent weaker than other trail pheromone scents deposited by other foragers which have discovered other objectives at approximately the same time, falsely indicating to the harvesters that the first objective is less interesting than the others.

Other features of the invention further disrupt the use of pheromone-assisted foraging. If the protected area (here, the sprinkler head 118) is reached, the forager may begin to deposit a trail pheromone on the surface 146 of outer obstacle wall 126 as it leaves the protectable area. When the pest reaches the bottom of the obstacle wall 126 (FIG. 3), it may fall or elect to jump to the surface 134. In that event, the trail pheromone will not be continuous. Any harvesters which follow the trail pheromone will be unable to go past the point of discontinuity. The harvesters access to the food source or other objective source will be precluded because a continuous trail pheromone does not exist.

Disruption of the communication process described above during the organization phase of cooperative foraging is very dysfunctional to successfully utilizing a food or other objective source.

Another feature of the present invention defeats pests which are using air-borne scents to discover food or other objective sources. Once the pest seeking the scent of the objective is within the barrier area 160 between the obstacle wall and cylindrical wall, the scent from the food or other objective source no longer provides direction. The scent would appear to the insect to be coming from the disc member 122 or the ground 102. The scent travels around the obstacle wall 126 and enters the barrier area from the level of the disc member 122. This directs the insect to return to the start of the pathway 154, exiting the barrier area 160, rather than continuing the search within the barrier area 160.

To provide a further barrier, if desired, pest poison or repellant may be placed on either or both of the inside surfaces 140, 144 of the barrier area. The poison and/or repellant may be of several types: spray, liquid, gel, adhesive, etc. This feature is not necessary in many applications, however.

Another possible embodiment of this invention is shown in FIG. 6. Instead of being attached directly to the cylindrical central member 124, the annular disc member 222 extends inward from the frustumconical member 126 toward the cylindrical central member 124. All parts of the annular disc member 222 are preferably located at least the predetermined distance "X" from the outer cylindrical surface 140. In this embodiment, the first pathway 254 is simply the outer cylindrical surface 140, and the second pathway 256 comprises surfaces 144, 134, 138, 136, 146, and 152 of the frustumconical member 126 and the annular member 222. Referring, for example, to FIG. 6, a generally annular gap having the radial dimension "x" is defined between the surface 138 and the surface 140.

The embodiment of FIG. 6 might be better to prevent foreign matter from becoming lodged in the pest preventer and defeating its function by providing an alternative route to the second pathway 256. Also, depending on the context in which the device is used, this embodiment may further decrease the visual, olfactory, heat, and/or electrical stimuli available to a pest for its navigation within the barrier area 160. For example, light coming from above cannot reflect off the surface 134 and up into the device of FIG. 6 because the surface 134 extends directly from the surface 144, with no opening between them for admitting light.

Additional embodiments correspond to FIG. 7 and FIGS. 11 through 14, inclusive, of U.S. Pat. No. 5,097,641, descriptions for which appear in that patent in column 5, between lines 32 through 51, inclusive. Those Figures and that description are incorporated herein by reference.

A plurality of crawling pest preclusion devices 120 may be installed in series in order to further reduce the probability of pest incursion into the sprinkler 118. That is, the crawling pests would be required to circumnavigate more than one pest preventer mounted on a particular conduit. For example, two or more devices 120 may be mounted on one conduit 116.

Figure 8:
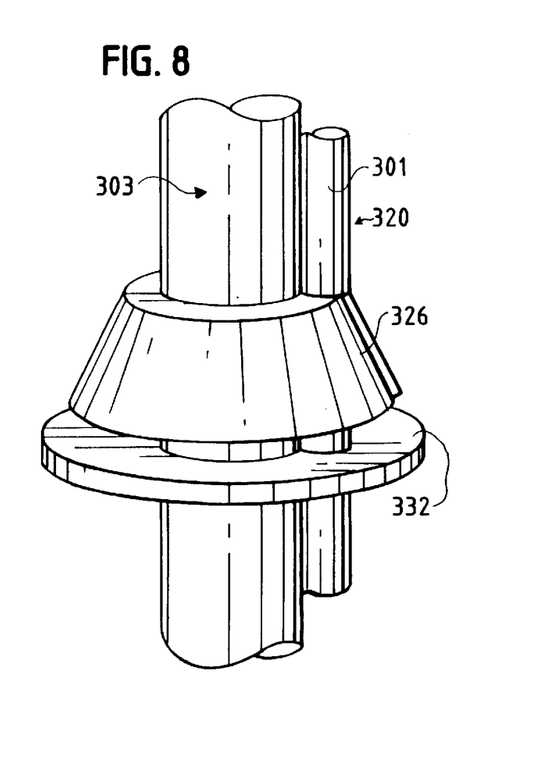
FIG. 8 is a view similar to FIG. 3 of a pole mount embodiment of a crawling pest preventer.

As shown in the alternate embodiment of FIG. 8, an eccentric pole or support 301 and a conduit 303 running in the same direction can both be surrounded by a single pest preventer 320. The disc member 322 and the frustumconical member 326 are fashioned to receive both the pole or support 301 and the conduit 303 to provide a barrier area 360 like the barrier area 160 described above.

The pest preclusion device 120 may be manufactured from a wide range of materials. The materials chosen would reflect the conditions surrounding specific installation and application problems. The color, composition, and material of which the inner surfaces 134, 140, and 144 are made will affect the effectiveness of the device 120 according to how they scatter, reflect, or absorb light, as described above.

The pest preclusion device 120 may either be manufactured as a retrofit for an existing irrigation device or as an integral portion of the irrigation device to be protected.

Referring now to FIG. 7, the disc member 122 may be eliminated in some applications of the preventer 420 by extending the length of the obstacle wall 126 sufficiently to provide an equally dense shadow within the upper portion of the barrier area 160. This attenuates ultraviolet light sufficiently to disorient the pest and serves to disrupt the pest's phototactic, ultraviolet orientation, and other orientation-navigation systems.

The extent to which lengthening the obstacle wall 126 will allow the preventer to function without a disc member 122 depends upon the amount and the direction of ultraviolet and unpolarized light (such as sunlight) during the day, and moon or star light at night. For example, where little or no reflected light bounces upward under the obstacle member 126, little or no light will reach the barrier area 160. However, where substantial direct or indirect light can enter the area 160 from beneath, a disc member 122 may be needed. Thus, in an environment where rays of light form an obtuse angle "a" with respect to the pathway leading onto the inside surface 140, then the obstacle member 126 may be extended to shadow the surface 140 and barrier area 160.

The terms "insect" and pest have been used in a broad sense to include small pests of the crawling (land moving) variety which seek to climb onto, for example, a water source. Such pests include gastropods such as snails and slugs.

It is to be understood, of course, that the foregoing describes different embodiments of the present invention and that modifications may be made therein without departing from the spirit or scope of the present invention as set forth in the appended claims.

We claim:

1. A crawling pest barrier for a conduit with an inlet and an outlet, which prevents crawling pests of a predetermined size from crawling past the barrier to the outlet of the conduit, comprising:

A generally cylindrical surface adapted to encircle a conduit, said surface having a first boundary and a second boundary axially spaced from said first boundary;

a projecting member extending outwardly from said generally cylindrical surface, the projecting member having a first surface facing said first boundary, an edge surface, and a second surface facing said second boundary, said projecting member surfaces and said generally cylindrical surface forming a first pathway for movement therealong by the crawling pest from the region on one side of the projecting member toward said second boundary; and an obstacle member having an inner margin and an outer margin, said inner margin being secured to said generally cylindrical surface, said obstacle member being spaced apart from said projecting member in a direction toward the second boundary, for blocking movement of a crawling pest along said first pathway, said obstacle member having an inside surface facing said first boundary and ending in an edge defined by said outer margin and separated from said first surface by a distance greater than the predetermined size, said inside surface providing a second pathway leading in a direction away from the upper end of the generally cylindrical surface and away from the first pathway, the obstacle member being spaced from said generally cylindrical surface a sufficient distance to form a phototactic barrier along the first pathway by shadowing thereof to discourage continued movement by a pest along the first pathway toward the second boundary.

2. A crawling pest barrier for a conduit according to claim 1, wherein said obstacle member includes a frustumconical portion depending from said inner margin toward said first boundary with increasing diameter.

3. A crawling pest barrier for a conduit according to claim 1, wherein said projecting member is secured adjacent to said first boundary of said generally cylindrical surface.

4. A crawling pest barrier for a conduit according to claim 1, wherein said obstacle member is secured adjacent to said second boundary of said generally cylindrical surface.

5. A crawling pest barrier for a conduit according to claim 1, wherein said generally cylindrical surface, said projecting member, and said obstacle member are formed of separate components.

6. A crawling pest barrier for a conduit according to claim 1, wherein said generally cylindrical surface, said projecting member, and said obstacle member are formed as a single piece.

7. A crawling pest barrier for a conduit according to claim 1, further comprising a conduit engaged by said generally cylindrical surface, said projecting member, and said obstacle member.

8. A crawling pest barrier for a conduit according to claim 7, wherein said conduit defines said generally cylindrical surface.

9. A crawling pest barrier for a conduit according to claim 7, wherein said conduit, said generally cylindrical surface, said projecting member, and said obstacle member are integral.

10. A crawling pest barrier for a conduit according to claim 1, wherein said generally cylindrical surface is separate from a conduit to be protected, said barrier further including a bonding agent for sealing the area between said crawling pest barrier and a conduit.

11. A crawling pest barrier for a conduit according to claim 1, wherein said edge surface of said projecting member extends at least as far radially outward as said outer margin of said obstacle member, each with respect to said generally cylindrical surface.

12. A crawling pest barrier for a conduit according to claim 1, wherein said second surface is planar.

13. A crawling pest barrier for a conduit according to claim 1, wherein said second surface is free of liquid chemicals.

14. A crawling pest barrier for a conduit according to claim 1, wherein said first surface and said second surface are orthogonal to said substantially cylindrical surface.

15. A crawling pest barrier for a conduit with an inlet and an outlet, which prevents crawling pests of a predetermined size from crawling past the barrier to the outlet of a conduit, said barrier comprising:

A. a generally cylindrical surface adapted to encircle the conduit, said surface having a first boundary and a second boundary axially spaced from said first boundary, and forming a first pathway for movement therealong by the crawling pest from the region on one side of said first boundary toward said second boundary;

B. an obstacle member having an inner margin and an outer margin, said inner margin being secured to said generally cylindrical surface, for blocking movement of the crawling pest along said generally cylindrical surface in an axial direction, said obstacle member having an inside surface facing said first boundary and ending in an edge defined by said outer margin;

C. a generally annular opening between the outer margin of said obstacle member and said generally cylindrical surface;

D. a generally annular shading member disposed in said generally annular opening and at least partially shading said opening; and E. a generally annular gap defined by the portion of said generally annular opening not occupied by said generally annular shading member, said gap having inner and outer edges separated by a minimum distance greater than the predetermined size.

* * * * *